March 27, 1934.    F. R. HAHN    1,952,128
SPRING AND STABILIZER
Filed April 6, 1931
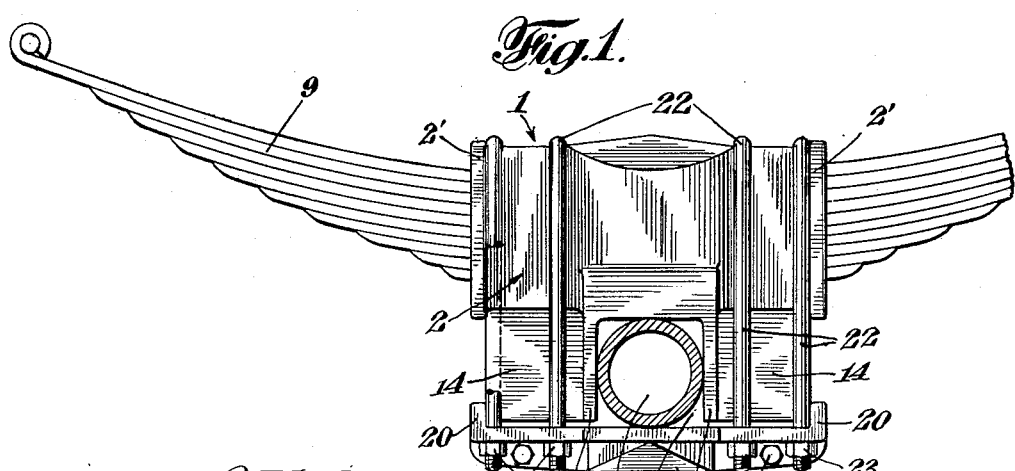
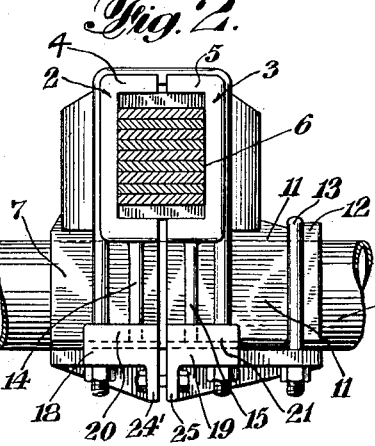 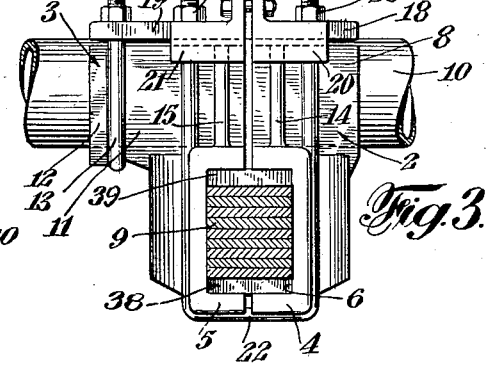
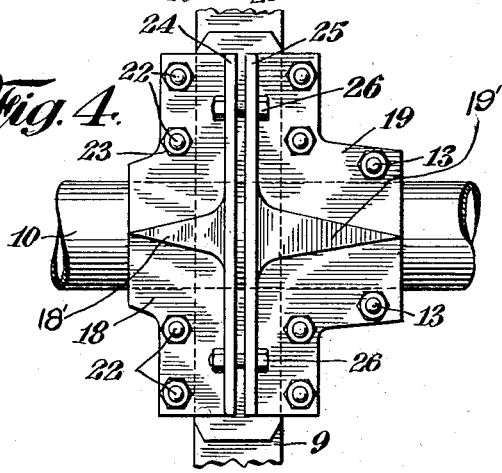 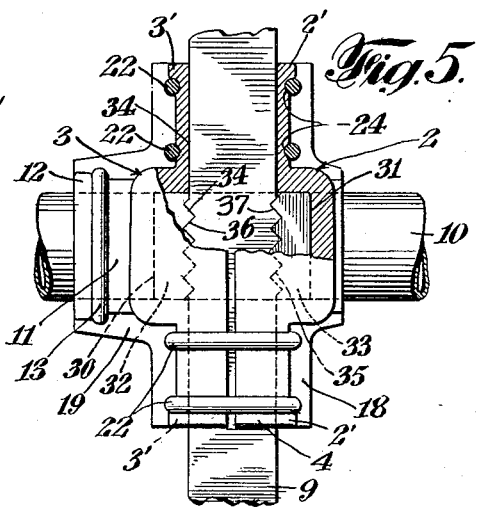
INVENTOR
Frank R. Hahn
BY
Prindle Bean & Mann
ATTORNEY Patented Mar. 27, 1934

1,952,128

UNITED STATES PATENT OFFICE 1,952,128

SPRING AND STABILIZER

Frank R. Hahn, Decatur, Ill.

Application April 6, 1931, Serial No. 527,888

11 Claims. (Cl. 267—52)

This invention relates to improvements in spring supports or stabilizers adapted to hold the springs and axles, as well as the axle housings, in alinement.

The present method employed in holding these units assembled is commonly to attach a top and bottom plate of metal, the assembly being held by U-bolts, as is well understood. Recently special stay rods leading from the rear axle or housing to the frame of the truck or vehicle have been eliminated and, therefore, the springs of the vehicle have to do all the work which was formerly done by these rods and springs together. When starting a truck or vehicle the impact is first registered in the main frame and then in the spring shackles and then at the junction of the spring and axle connection. As the shackle bolts wear, the U-bolts become loosened and the parts, therefore, become loosened and inefficient and noisy operation is obtained. In continued driving and backing on rough roads or ground or loose materials, the U-bolts will become loose and will allow the rear assembly to become out of alinement with the result that the main center spring assembly bolt shears off and the ring and pinion gears of the rear assembly are damaged when the parts of the vehicle are in disalinement.

My device overcomes the foregoing defects and keeps the parts in alinement and prevents undue wear of the parts.

An object of this invention is to provide a relatively simple device which may be used on a front or rear axle construction and which will function to support a spring construction on an axle housing and maintain the parts in proper position.

Another object of this invention is the provision of a device in which the spring support and the leaves of the spring have interfitting parts to prevent relative movement of the spring support and the leaves of the spring.

To the accomplishment of the foregoing and such other objects as may hereinafter appear, this invention consists in the construction, combination, and arrangement of parts hereinafter described and then sought to be defined in the appended claims, reference being had to the accompanying drawing forming a part hereof, and which shows merely for the purpose of illustrative disclosure, a preferred embodiment of my invention, it being expressly understood, however, that various changes may be made in practice within the scope of the claims without digressing from my inventive idea.

In the drawing,—

Figure 1 is a side elevation showing the device applied to a spring and axle construction, the spring being shown above the axle.

Figure 2 is a vertical transverse section taken substantially on line 2—2 of Figure 1.

Figure 3 is a vertical transverse section of another spring suspension in which the spring is underslung or beneath the axle.

Figure 4 is a bottom plan view with the ends of the spring cut away, and

Figure 5 is a top plan view with parts broken away and in section to facilitate the disclosure.

Referring now to the drawing, the reference character 1 designates a split housing forming part of the spring support or stabilizer and shown in Figure 1 as applied to a laminated leaf spring which is above the axle construction. The housing is formed of two parts, 2 and 3, having the inwardly directed flanges 4 and 5 which are adapted to form a rectangular passage-way 6 when the parts are assembled. The parts 2 and 3 are formed with the end shoulders 2' and 3' which form abutment means for U-bolts to be later described. The part 2 of the housing 1 is provided with spaced parallel flanges 7 and 8 which extend at right angles to the vertical plane of the spring, and which form a channel 7' which receives the axle construction 10. The other part 3 of the housing is provided with a U-shaped extension or apron 11 which is in alinement with channel 7' and extends at right angles to the vertical plane of the spring 9 and over the axle construction 10. The extension 11 is provided with an end shoulder 12 and a U-bolt 13 abuts the shoulder 12. This extension may be of any length and gives added strength to the housing and forms a means for rigidly securing and holding the spring support on the axle construction. Part 2 may also be provided with a similar extension. This extension 11 affords greater stability to the springs when a side pressure is exerted on them as when the vehicle swings from one side to the other, as, for instance, when the vehicle is top heavy.

Depending from the lower portion of each part 2 and 3 of the housing are the spaced parallel wings 14 and 15 which extend at right angles to the flange 7 and extension 11. The lower parts of flange 7, extension 11 and wings 14 and 15, are substantially in the same plane.

The means for securing the support in position on the axle housing will now be described. Abutting axle construction 10 are the plates 18 and 19, each of which is formed with end flanges 20 and 21. These plates are provided with a plurality of holes adapted to receive the U-bolts 22. A nut 23 is provided for each U-bolt for uniting the parts. The housing is provided with depressions 24 which are adapted to receive the arms of U-bolts and position and hold them. These depressions may be dispensed with. As shown in the drawing, there are four U-bolts, the end ones abutting shoulders 2' and 3', but it is to be expressly understood that the number of bolts may be varied. The flanges 20 and 21 of the plates abut the ends of wings 14 and 15, and these flanges being spaced tend to form a rigid structure with the remaining parts of the spring support. If desired, parts 2 and 3 of housing 1 may be connected by a transverse bolt to hold the parts in rigid position.

Depending from adjacent edges of the plates 18 and 19 are the elongated parallel flanges 24' and 25. These flanges are provided with alined openings to receive the bolts 26 which clamp the plates together. The bottom of each plate is provided with an integral reinforcing rib which extends from and is integral with the flanges 24' and 25. The reinforcing rib 19' on plate 19 is longer than the reinforcing rib 18' on plate 18, the plate 19 being extended in order to form a base to which the U-bolt 13 on extension 11 is secured. These plates while being shown as made of two plates, may be made integral, and then different plates are used with different sized springs.

In order to secure the spring leaves to the housing 1 and prevent relative movement and wear of the parts, the following construction is provided. The passage 6 in the housing 1 is adapted to receive the spring. Parts 2 and 3 of the housing 1 are provided with vertical angular channels 30 and 31 in the parts 2 and 3 of the housing 1. Fitting in these channels are the blocks or dogs 32 and 33 provided with the corrugations 34 and 35. Another form of the invention contemplates the elimination of these blocks or dogs, in which case the corrugations just described in connection with the blocks or dogs are formed integrally with the housing. The leaves of the spring 9 are provided with the corrugations 36 and 37 which correspond in form and position to corrugations 34 and 35 on the dogs or blocks 32 and 33. It is to be noted that the center bolt for the spring has been eliminated and, therefore, the leaves of the spring are not weakened as in the ordinary construction. The corrugations or stepped formation on the dogs and leaves of the spring cooperate to form an interfitting of the parts and prevent relative movement and constant wearing of the assembly. The spring fillers 38 and 39 are provided to allow for the spring curvature and to hold the parts in assembled position.

My device may be used either on the front or rear axle construction, and may be used with an underslung spring, as shown in Figure 3, or in a construction where the spring is above the axle construction.

While the corrugations have been shown as of a stepped formation, it is to be expressly understood that I am not to be restricted to this particular form, since any other interfitting of the parts may be used and comes within the contemplation of my invention. The spring leaves may be formed with projections which fit in depressions in the housing. It is also to be expressly understood that the interfitting corrugations may be omitted both on the spring and on the housing, and the housing with a smooth interior may be applied to the ordinary springs now in use.

The manner in which the device is assembled and put into use will now be described. The U-bolts 13 and 22 are removed from the device and the parts 2 and 3 of the housing, together with the spring fillers 38 and 39 are placed on the midsection of a laminated leaf spring. When the spring is received in the housing it is, of course, necessary to have the corrugations or angular portions of the spring 9 and the dogs 32 and 33 register. The flanges 7 and 8 and the apron or extension 11 surround the axle construction 10. The U-bolts 13 and 22 are then placed in position and the plates 18 and 19 are positioned so that they abut the axle construction 10. The nuts 23 are then applied to the U-bolts to secure the plates 18 and 19 to the device. The plates 18 and 19 are then secured together by means of the bolts 26 extending through parallel flange portions 24' and 25. The apron or extension 11 tends to hold the spring from swaying or moving when there is a tendency of the vehicle to sway. Also the central hole in the spring leaves has been eliminated so that the leaves are not weakened as in the ordinary construction.

It will be apparent that I have provided a relatively simple device which is durable and which keeps the parts of the vehicle in proper alinement, so as to prevent undue wear.

What I claim is:

1. A spring support and stabilizer, comprising, in combination, a spring housing adapted to be attached to a vehicle axle, said housing being formed of a plurality of parts, means including U-bolts for attaching said housing to a spring and axle construction and corrugated dogs in said housing for holding the spring in assembled position.

2. A device of the character described, including, in combination, a split housing, adapted to receive a spring and provided with flanges adapted to receive an axle construction and means including a split plate member for clamping said housing on an axle construction.

3. A device of the character described, including, a leaf spring construction, certain leaves having corrugated edges, dogs or blocks mounted in said housing and formed with corrugations which interfit with the corrugations on said leaves to prevent relative movement of the parts of the assembly.

4. A device of the character described, including, in combination, a split housing adapted to receive a leaf spring and provided with flanges and an extension adapted to fit over a relatively large portion of an axle construction so as to afford greater stability to the spring and prevent lateral displacement thereof.

5. A device of the character described, including, in combination, a split housing, one of the parts of the housing being formed with spaced flanges adapted to receive an axle construction, the other part of the housing being formed with a U-shaped extension adapted to fit over the axle construction, and plate means adapted to abut the axle construction when secured in position to the housing.

6. In a device of the character described, a housing adapted to receive a laminated leaf spring, said housing being provided with a plurality of depending flanges which are positioned in angular relation to each other, and plate means for securing the device to a spring and axle construction.

7. A device of the character described including in combination a split housing, each portion of the housing being adapted to receive a spring and an axle construction, and means for clamping said housing in position so that a spring is firmly held on an axle construction.

8. A device of the character described including in combination a split housing, each portion of the housing being adapted to receive a spring and an axle construction, and means for clamping said housing in position so that a spring is firmly held on an axle construction, said means including a split plate member.

9. A device of the character described, including in combination a housing adapted to receive a leaf spring and provided with a lateral extension adapted to extend over and receive a relatively large portion of an axle construction so as to rigidly hold the parts in assembled position, and means for securing said housing to a spring and an axle construction.

10. A device of the character described, including in combination, a split housing, each portion of the housing being adapted to receive a spring and an axle construction, means for securing said housing to a spring and an axle construction, said housing being provided with an extension adapted to extend over and receive a relatively large portion of an axle construction so as to rigidly hold the parts in assembled position.

11. A device of the character described including, in combination, a two-part housing adapted to receive a leaf spring, said housing being provided with a plurality of internal projections for positioning said spring, and plate means adapted to rigidly hold the parts of the housing in assembled position when said device is applied to a spring and axle construction.

FRANK R. HAHN.